United States Patent [19]

Howard et al.

[11] Patent Number: 4,782,413
[45] Date of Patent: Nov. 1, 1988

[54] MAGNETORESISTIVE SENSOR WITH MIXED PHASE ANTIFERROMAGNETIC FILM

[75] Inventors: James K. Howard, Morgan Hill; Ting C. Huang, San Jose, both of Calif.

[73] Assignee: International Business Machines Corporation, Armonk, N.Y.

[21] Appl. No.: 43,674

[22] Filed: Apr. 28, 1987

[51] Int. Cl.$^4$ ............................ G11B 5/12; G11B 5/30
[52] U.S. Cl. .................................................... 360/113
[58] Field of Search ............................... 360/113, 110

[56] References Cited

U.S. PATENT DOCUMENTS

| | | | |
|---|---|---|---|
| 4,103,315 | 7/1978 | Hempstead et al. | 360/110 |
| 4,663,685 | 5/1987 | Tsang | 360/113 |

OTHER PUBLICATIONS

"Magnetics of Small Magnetoresistive Sensors", by Tsang, J. Appl. Phys. 55(6), Mar. 15, 1984, pp. 2226–2231.

"Exchange Induced Unidirectional Anisotrope at FeMn–Ni$_{80}$Fe$_{20}$ Interfaces", by Tsang et al., J. Appl. Phys. 52(3), Mar. 1981, pp. 2471–2473.

Unidirectional Anisotropy in Nickel-Iron Films . . . ", by Hempstead et al., IEEE Transactions on Magnetics, vol. Mag-14, No. 5, Sep. 1978.

*Primary Examiner*—John H. Wolff
*Attorney, Agent, or Firm*—Thomas R. Berthold

[57] ABSTRACT

An improved thin film magnetoresistive (MR) sensor uses an iron-manganese (FeMn) alloy, with the alpha (body-centered-cubic) phase of FeMn present in the alloy, as an antiferromagnetic layer. The presence of alpha FeMn improves the longitudinal exchange bias in the ferromagnetic MR layer, especially when the amount of alpha FeMn exceeds the amount of gamma (face-centered-cubic) FeMn in the FeMn layer.

5 Claims, 3 Drawing Sheets

MAGNETORESISTIVE SENSOR WITH MIXED PHASE ANTIFERROMAGNETIC FILM

FIELD OF THE INVENTION

This invention relates to magnetoresistive (MR) read sensors, and in particular to a MR read sensor in which in improved antiferromagnetic film provides a longitudinal bias field in the ferromagnetic MR film of the sensor.

DESCRIPTION OF THE PRIOR ART

A general description of the principle of operation of MR sensors in magnetic recording systems is provided by Tsang in "Magnetics of Small Magnetoresistive Sensors", *J. Appl. Phys.*, Vol. 55(6), Mar. 15, 1984, pp. 2226–2231.

A MR sensor for reading information signals from a magnetic recording medium is described in U.S. Pat. No. 4,103,315 by Hempstead, et al., which is assigned to the same assignee as this application. U.S. Pat. No. 4,103,315 describes a MR read sensor which utilizes antiferromagnetic-ferromagnetic exhange coupling to produce a uniform longitudinal bias in the MR layer of the sensor. Commonly assigned U.S. Pat. No. 4,663,685 is directed to such a MR sensor, but describes an FeMn antiferromagnetic layer which is divided into separate end portions for providing an exchange bias primarily in the adjacent end portions of the MR layer. The exchange coupling between the antiferromagnetic and ferromagnetic layers creates a single domain state in the ferromagnetic layer and thereby suppresses the so-called Barkhausen noise associated with domain activity. For this reason it is desirable to maximize the exchange bias effect in the MR layer.

The materials suggested by U.S. Pat. No. 4,103,315 are nickel-iron (NiFe) as the ferromagnetic MR layer and a face-centered-cubic (FCC) phase (gamma phase) of manganese (Mn) alloy as the antiferromagnetic layer. Of the possible gamma Mn alloys, iron-manganese (FeMn) appears to exhibit the greatest ability to exchange couple with the NiFe layer.

The strength of the exchange bias field for exchange coupled films of sputter deposited NiFe/FeMn and FeMn/NiFe has been studied by Tsang, et al. in "Exchange Induced Unidirectional Anisotropy at FeMn-Ni$_{80}$Fe$_{20}$ Interfaces", *J. Appl. Phys.* Vol. 52 (3), March 1981, pp. 2471–2473. This reference also describes the effect of varying the FeMn film thickness on copper (Cu) substrates and suggests that the loss of exchange bias in the NiFe layer with increasing FeMn film thickness is due to the loss of the gamma phase away from the Cu/FeMn interface.

SUMMARY OF THE INVENTION

The invention is an improved MR sensor wherein the antiferromagnetic layer formed in direct contact with the MR layer is an alloy of Fe and Mn, with at least a portion of the FeMn alloy being in the alpha (body-centered-cubic or BCC) phase. The improved antiferromagnetic layer composition substantially increases the exchange bias effect in the MR sensor.

For a fuller understanding of the nature and advantages of the present invention reference should be made to the following detailed description taken in conjunction with the accompanying drawings.

DESCRIPTION OF THE PREFERRED EMBODIMENT

Figure 1:
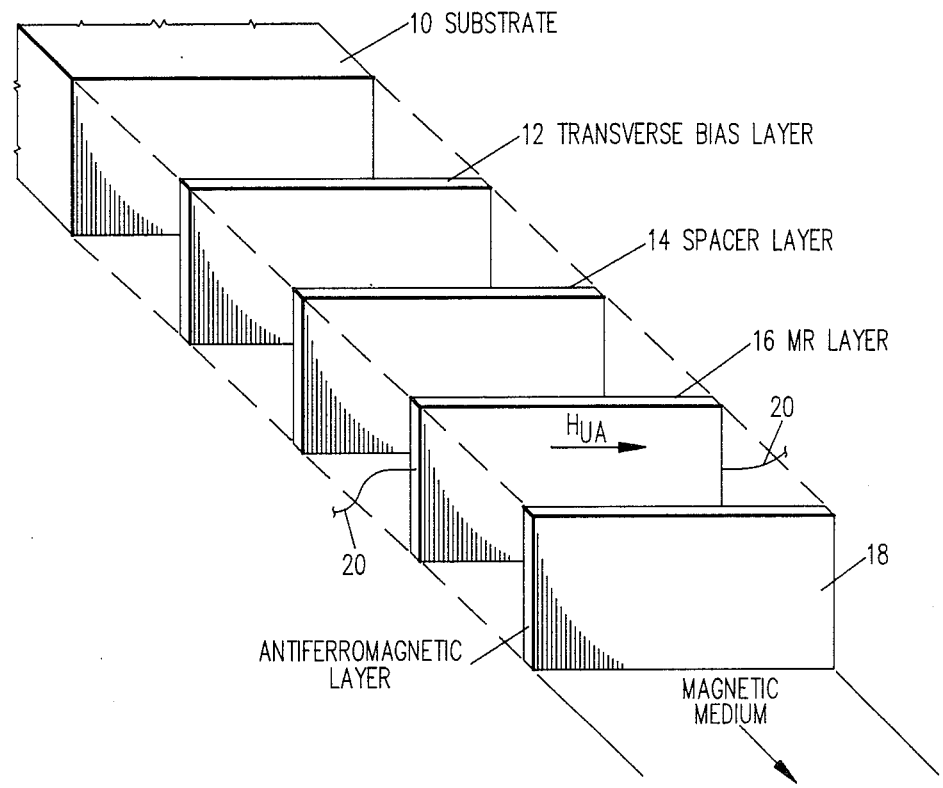
FIG. 1 is a schematic representation of a prior art thin film MR sensor.

As illustrated in FIG. 1, a typical thin film MR sensor comprises a substrate 10, a transverse bias layer 12, a spacer layer 14, a MR layer 16 and an antiferromagnetic layer 18. The MR layer 16 which is formed of ferromagnetic material such as Ni$_{80}$Fe$_{20}$, is attached to electrical conductors 20 and provides an output current. The output current from MR layer 16 is a signal which enables a separate sensing circuit to determine resistance changes in the MR layer. The resistance changes are a function of changes in the magnetic fields intercepted by MR layer 16 from recorded data on the magnetic storage medium.

In order to assure that MR layer 16 has uniaxial anisotropy an antiferromagnetic layer is formed on MR layer 16. The antiferromagnetic layer, which in the prior art may be the gamma phase of Mn alloys, creates an interface exchange coupling with the ferromagnetic MR layer 16. This results in a longitudinal exchange bias field ($H_{UA}$) in MR layer 16 and creates a single magnetic domain state in MR layer 16. The existence of a single magnetic domain state in MR layer 16 is essential to suppress Barkhausen noise which is associated with MR materials which exhibit multiple magnetic domain states.

The transverse bias layer 12 provides a magnetic field oriented generally perpendicular to the medium so as to slightly bias the magnetic field in MR layer 16 in a direction non-parallel to the medium. This transverse bias maintains the MR layer 16 in a linear response mode such that the current output is essentially a linear function of the resistance changes. As is known in the art, the transverse bias can be provided by shunt biasing, soft film biasing, or permanent magnet biasing.

A more comprehensive description of the MR sensor of FIG. 1 and alternative embodiments of it are described in U.S. Pat. No. 4,103,315. The MR sensor shown in FIg. 1 is similar to that described in U.S. Pat. No. 4,663,685 with the exception that in this patent the antiferromagnetic layer 18 is divided into two separate end portions with a space between so as to provide longitudinal exchange bias primarily in the end portions of MR layer 16.

In order to determine the effect of the different crystalline phases of the FeMn antiferromagnetic layer on the NiFe ferromagnetic layer, film structures were formed by depositing films of FeMn under various sputtering conditions on NiFe layers formed on different substrates. An X-ray diffraction analysis was then performed on these FeMn films. A comparison of the relative values of the diffraction peaks with the known peaks for the alpha and gamma phases yielded the relative percentages of the two phases present in the FeMn film. A magnetic hystersis loop was then computed for the film structures by use of a vibrating scanning magnetometer to determine the loop shift or exchange bias ($H_{UA}$). The magnitude of $H_{UA}$ was then plotted as a function of the relative amounts of the alpha and gamma phases of FeMn.

Figure 2A:
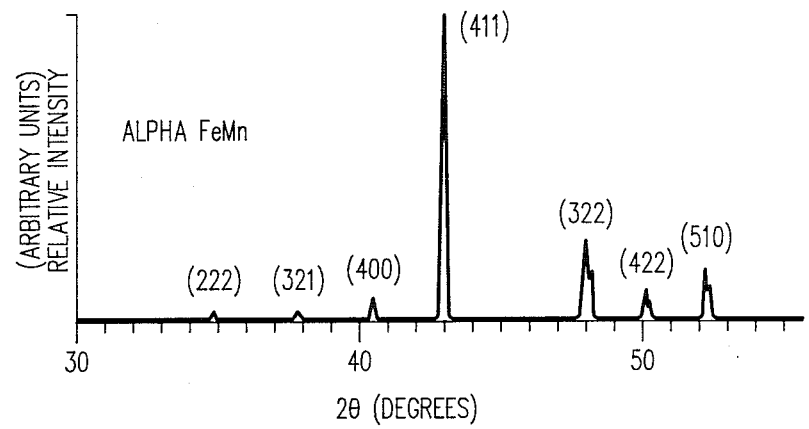
FIGS. 2A and 2B are plots of X-ray diffraction patterns for FeMn alpha and gamma phases, respectively.
Figure 2B:
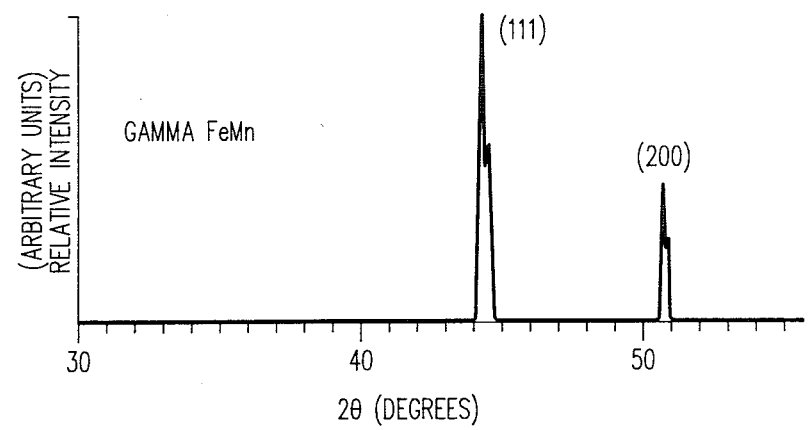

The calculated X-ray diffraction patterns for phases of pure alpha and pure gamma FeMn are shown in FIGS. 2A and 2B. Each of the peaks corresponds to reflection from a particular plane in the crystalline structure, as identified in FIGS. 2A and 2B. Thus, it is possible to determine the presence of the FeMn phases in a particular film from an X-ray diffraction scan by comparing the location of the measured peaks with the location of the known peaks.

The relative magnitudes of the diffraction peaks corresponding to the respective FeMn phases were measured to two sets of FeMn films. The first set of FeMn films was deposited on a 400 Angstrom NiFe layer formed directly on a glass substrate, and the second set of FeMn films was deposited on a 400 Angstrom NiFe layer formed on a hexagonalclose-packed (HCP) tantalum (the beta phase of Ta) underlayer on a glass substrate. The exchange bias was measured for these films and plotted as a function of percent alpha FeMn in the FeMn film. This data is shown in FIGS. 3 and 4, wherein each data point is identified by the specific sputtering conditions of target voltage and argon pressure.

Figure 3:
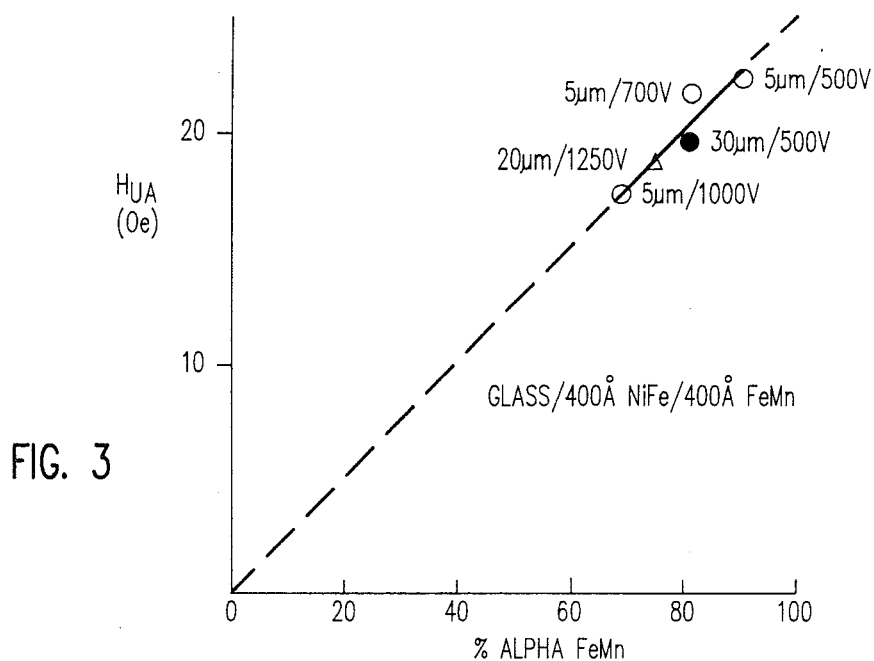
FIG. 3 is a graph of loop shift or exchange bias ($H_{UA}$) in a NiFe layer as a function of the percentage of alpha FeMn present in the FeMn layer in a structure wherein the NiFe film is formed directly on a glass substrate.
Figure 4:
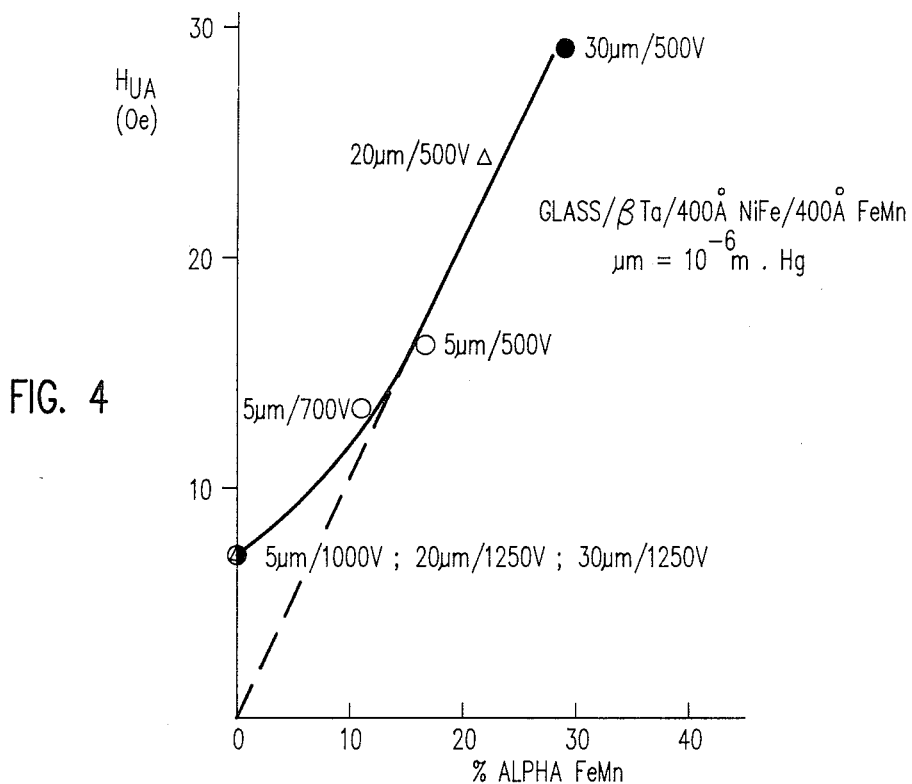
FIG. 4 is a graph of $H_{UA}$ in a NiFe layer as a function of the percentage of alpha FeMn present in the FeMn layer in a structure wherein the NiFe film is formed on a tantalum (Ta) underlayer formed on a glass substrate.

The data shown in FIGS. 3 and 4 indicate that the exchange bias is increased by the amount of alpha FeMn present in the antiferromagnetic layer. The amount of alpha FeMn present strongly depends upon the substrate and the sputtering conditions. Thus, the strength of the exchange bias is a function not only of the substrate on which the NiFe layer is formed, but also the sputtering conditions. Generally, $H_{UA}$ is increased at lower target voltages, which corresponds to low deposition rates, and at higher sputtering pressures.

When FeMn is deposited onto a HCP phase of Ta then the gamma FeMn phase is the dominant structure in the antiferromagnetic material. Note that in FIG. 4 the exchange bias, $H_{UA}$, varies from 7 Oe to 29 Oe with the sputtering pressures and target voltages. Deposition of NiFe/FeMn on glass or other nonmetallic substrates reduces the dependence of $H_{UA}$ on deposition power and pressure (FIG. 3) and produces large amounts of the alpha FeMn phase. The presence of a BCC phase of Ta as an underlayer (or other BCC metals such as Mo, W, and Nb) tends to increase the amount of the alpha FeMn phase.

Because alpha FeMn is the stable phase of the FeMn alloy, a MR sensor formed with an antiferromagnetic FeMn layer containing alpha FeMn as the dominant phase exhibits exchange bias properties that are unchanged after thermal cycling from room temperature to a process temperature of approximately 260° C. over a 20 hour period. FeMn films which contain little or no alpha FeMn have been observed to produce MR sensors with exchange properties that degrade with such repeated thermal cycling.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. An improved magnetoresistive sensor of the type having an antiferromagnetic layer in direct contact with a magnetoresistive ferromagnetic layer for inducing a longitudinal bias in the ferromagnetic layer, wherein the improvement is an antiferromagnetic layer comprising an iron-manganese (FeMn) alloy having at least a portion of the FeMn in the alpha phase.

2. The improved sensor according to claim 1 wherein said ferromagnetic layer is an alloy comprising nickel and iron.

3. A magnetoresistive sensor for use as a read sensor when exposed to external magnetic fields and when connected to means for sensing changes in electrical resistance, the magnetoresistive sensor comprising:
  a thin magnetoresistive layer of ferromagnetic material;
  a thin layer of antiferromagnetic material in direct contact with the magnetoresistive layer for inducing a magnetic exchange bias in the magnetoresistive layer, the antiferromagnetic material being an alloy comprising iron (Fe) and manganese (Mn), wherein the Fe and Mn form the alpha phase in at least a portion of the antiferromagnetic layer; and
  means coupled to the magnetoresistive layer for producing a transverse bias in said magnetoresistive layer.

4. The sensor according to claim 3 wherein the FeMn layer also includes the gamma phase of FeMn and wherein the amount of alpha FeMn exceeds the amount of gamma FeMn.

5. The sensor according to claim 3 wherein said magnetoresistive layer is an alloy comprising nickel and iron.

* * * * *